United States Patent
Cao

(10) Patent No.: US 11,526,059 B2
(45) Date of Patent: Dec. 13, 2022

(54) ARRAY SUBSTRATE AND LIQUID CRYSTAL DISPLAY PANEL

(71) Applicant: Shenzhen China Star Optoelectronics Semiconductor Display Technology Co., Ltd., Shenzhen (CN)

(72) Inventor: Wu Cao, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/640,740

(22) PCT Filed: Dec. 20, 2019

(86) PCT No.: PCT/CN2019/126957
§ 371 (c)(1),
(2) Date: Feb. 21, 2020

(87) PCT Pub. No.: WO2021/114374
PCT Pub. Date: Jun. 17, 2021

(65) Prior Publication Data
US 2022/0317525 A1 Oct. 6, 2022

(30) Foreign Application Priority Data
Dec. 11, 2019 (CN) .......................... 201911269916.6

(51) Int. Cl.
G02F 1/1362 (2006.01)

(52) U.S. Cl.
CPC .. G02F 1/136286 (2013.01); G02F 1/136218 (2021.01)

(58) Field of Classification Search
None
See application file for complete search history.

(56) References Cited

U.S. PATENT DOCUMENTS

| 11,119,375 B1* | 9/2021 | Zhang | G02F 1/136218 |
| 2008/0239224 A1* | 10/2008 | Hori | G02F 1/136209 |
| | | | 349/139 |
| 2009/0290080 A1 | 11/2009 | Horiuchi et al. | |

(Continued)

FOREIGN PATENT DOCUMENTS

| CN | 101968591 A | 2/2011 |
| CN | 102648436 A | 8/2012 |

(Continued)

Primary Examiner — Phu Vu
(74) Attorney, Agent, or Firm — PV IP PC; Wei Te Chung; Ude Lu

(57) ABSTRACT

An array substrate and a liquid crystal display panel are provided. The array substrate includes data lines, scanning lines, common electrode lines, and pixels. Wherein, first areas corresponding to and adjacent to the data lines, second areas corresponding to and adjacent to the scanning lines, third areas corresponding to the common electrode lines, and fourth areas between adjacent rows of the pixels are provided with shield electrodes, and a disposition density of the shield electrodes corresponding to first sub-pixels is less than a disposition density of the shield electrodes corresponding to third sub-pixels. The present disclosure reduces dark-state light leakage phenomenon.

20 Claims, 4 Drawing Sheets

(56) References Cited

U.S. PATENT DOCUMENTS

| | | | |
|---|---|---|---|
| 2012/0194573 A1 | 8/2012 | Yamashita et al. | |
| 2015/0062507 A1 | 3/2015 | Park | |
| 2016/0033810 A1 | 2/2016 | Lee et al. | |
| 2016/0062203 A1* | 3/2016 | Ono | G02F 1/13439 438/30 |
| 2017/0160601 A1 | 6/2017 | Kang et al. | |

FOREIGN PATENT DOCUMENTS

| | | |
|---|---|---|
| CN | 106019750 A | 10/2016 |
| CN | 106125415 A | 11/2016 |

\* cited by examiner

ARRAY SUBSTRATE AND LIQUID CRYSTAL DISPLAY PANEL

FIELD OF INVENTION

The present disclosure relates to the field of display technologies, and more particularly, to an array substrate and a liquid crystal display panel.

BACKGROUND OF INVENTION

Shield electrodes are used to shield pixel electrodes from influences of data lines. However, limited by process conditions, cross-sectional surfaces of the shield electrodes present trapezoidal structures after etching, and an extending direction of a side of the trapezoid has a predetermined angle with a polarization axis of a polarizer, which causes light leakage when in a dark state, thereby affecting the display effect. It is more significant when a wiring design of the shield electrodes has bending structures or structures having crossed right angles.

Therefore, current liquid crystal display panels have a technical problem of light leakage in a dark state, and it needs to improve structural designs other than adjustments of processes and membrane quality.

Technical problem: the present disclosure provides an array substrate and a liquid crystal display panel to improve the technical problem of dark-state light leakage in current liquid crystal display panels.

SUMMARY OF INVENTION

To solve the above problem, an embodiment of the present disclosure provides following technical solutions:

the present disclosure provides an array substrate which comprises:

a plurality of data lines arranged at intervals along a vertical direction;

a plurality of scanning lines arranged at intervals along a horizontal direction;

a plurality of common electrode lines in parallel with the data lines and disposed between the adjacent data lines; and a plurality of pixels arranged in an array distribution, wherein the pixels comprise first sub-pixels, second sub-pixels, and third sub-pixels;

wherein in the pixels, first areas corresponding to and adjacent to the data lines, second areas corresponding to and adjacent to the scanning lines, third areas corresponding to the common electrode lines, and fourth areas between adjacent rows of the pixels are provided with shield electrodes, and a disposition density of the shield electrodes corresponding to the first sub-pixels is less than a disposition density of the shield electrodes corresponding to the third sub-pixels.

In the array substrate provided by the present disclosure, wherein the shield electrodes are disposed in the four areas corresponding to the second sub-pixels and the third sub-pixels, and are not disposed in at least a part of the four areas corresponding to the first sub-pixels.

In the array substrate provided by the present disclosure, wherein corresponding to the first sub-pixels, the shield electrodes are disposed in the first areas, the second areas, and the third areas, and the shield electrodes are not disposed in at least a part of the fourth areas.

In the array substrate provided by the present disclosure, wherein corresponding to the first sub-pixels, the shield electrodes are disposed in the first areas, the second areas, and the fourth areas, and the shield electrodes are not disposed in at least a part of the third areas.

In the array substrate provided by the present disclosure, wherein corresponding to the first sub-pixels, the shield electrodes are disposed in the second areas, the third areas, and the fourth areas, and the shield electrodes are not disposed in at least a part of the first areas.

In the array substrate provided by the present disclosure, wherein corresponding to the first sub-pixels, the shield electrodes are disposed in the first areas and the second areas, and the shield electrodes are not disposed in at least a part of the third areas and at least a part of the fourth areas.

In the array substrate provided by the present disclosure, wherein corresponding to the first sub-pixels, the shield electrodes are disposed in the second areas and the fourth areas, and the shield electrodes are not disposed in at least a part of the first areas and at least a part of the third areas.

In the array substrate provided by the present disclosure, wherein corresponding to the first sub-pixels, the shield electrodes are disposed in the second areas, and the shield electrodes are not disposed in at least a part of the first areas, at least a part of the third areas, and at least a part of the fourth areas.

In the array substrate provided by the present disclosure, wherein the shield electrodes are disposed in the four areas corresponding to the third sub-pixels, and are not disposed in at least a part of the four areas corresponding to the first sub-pixels and the second sub-pixels.

In the array substrate provided by the present disclosure, wherein a disposition density of the shield electrodes corresponding to the second sub-pixels is greater than or equal to the disposition density of the shield electrodes corresponding to the first sub-pixels.

In the array substrate provided by the present disclosure, wherein a disposition position of the shield electrodes corresponding to the second sub-pixels is same as a disposition position of the shield electrodes corresponding to the first sub-pixels.

In the array substrate provided by the present disclosure, wherein a disposition density of the shield electrodes corresponding to odd rows of the first sub-pixels is greater than a disposition density of the shield electrodes corresponding to even rows of the first sub-pixels.

In the array substrate provided by the present disclosure, wherein a disposition density of the shield electrodes corresponding to odd columns of the first sub-pixels is greater than a disposition density of the shield electrodes corresponding to even columns of the first sub-pixels.

In the array substrate provided by the present disclosure, wherein disposition densities of the shield electrodes corresponding to all the first sub-pixels are the same.

The present disclosure further provides a liquid crystal display panel which comprises a first substrate and a second substrate disposed opposite to the first substrate, wherein the first substrate comprises:

a plurality of data lines arranged at intervals along a vertical direction;

a plurality of scanning lines arranged at intervals along a horizontal direction;

a plurality of common electrode lines in parallel with the data lines and disposed between the adjacent data lines; and a plurality of pixels arranged in an array distribution, wherein the pixels comprise first sub-pixels, second sub-pixels, and third sub-pixels;

wherein in the pixels, first areas corresponding to and adjacent to the data lines, second areas corresponding to and adjacent to the scanning lines, third areas corresponding to the common electrode lines, and fourth areas between adjacent rows of the pixels are provided with shield electrodes, and a disposition density of the shield electrodes corresponding to the first sub-pixels is less than a disposition density of the shield electrodes corresponding to the third sub-pixels.

The beneficial effect of the present disclosure is: the present disclosure provides an array substrate and a liquid crystal display panel. The array substrate includes data lines, scanning lines, common electrode lines, and pixels, wherein the plurality of data lines are arranged at intervals along a vertical direction, the plurality of scanning lines are arranged at intervals along a horizontal direction, the plurality of common electrode lines are in parallel with the data lines and are disposed between the adjacent data lines, and the plurality of pixels are arranged in an array distribution, wherein the pixels comprise first sub-pixels, second sub-pixels, and third sub-pixels. Wherein in the pixels, first areas corresponding to and adjacent to the data lines, second areas corresponding to and adjacent to the scanning lines, third areas corresponding to the common electrode lines, and fourth areas between adjacent rows of the pixels are provided with shield electrodes, and a disposition density of the shield electrodes corresponding to the first sub-pixels is less than a disposition density of the shield electrodes corresponding to the third sub-pixels. The present disclosure reduces a density of the shield electrodes in the first sub-pixels, which reduces an intensity of the dark-state light leakage in the first sub-pixels, thereby reducing the dark-state light leakage phenomenon of the whole liquid crystal display panel.

DESCRIPTION OF DRAWINGS

The following detailed description of specific embodiments of the present disclosure will make the technical solutions and other beneficial effects of the present disclosure obvious with reference to the accompanying drawings.

DETAILED DESCRIPTION OF PREFERRED EMBODIMENTS

The present disclosure provides a liquid crystal display panel, a manufacturing method thereof, and a manufacturing system. In order to make the purpose, technical solutions, and effects of the present disclosure clearer and more definite, the following further describes the present disclosure in detail with reference to the drawings and embodiments. It should be understood that the specific embodiments described herein are only used to explain the disclosure, and are not used to limit the disclosure.

The present disclosure provides an array substrate and a liquid crystal display panel to improve the technical problem of dark-state light leakage in current liquid crystal display panels.

In the present disclosure, an array substrate includes data lines, scanning lines, common electrode lines, and pixels, wherein the plurality of data lines are arranged at intervals along a vertical direction, the plurality of scanning lines are arranged at intervals along a horizontal direction, the plurality of common electrode lines are in parallel with the data lines and are disposed between the adjacent data lines, and the plurality of pixels are arranged in an array distribution, wherein the pixels comprise first sub-pixels, second sub-pixels, and third sub-pixels. Wherein in the pixels, first areas corresponding to and adjacent to the data lines, second areas corresponding to and adjacent to the scanning lines, third areas corresponding to the common electrode lines, and fourth areas between adjacent rows of the pixels are provided with shield electrodes, and a disposition density of the shield electrodes corresponding to the first sub-pixels is less than a disposition density of the shield electrodes corresponding to the third sub-pixels.

Figure 1:
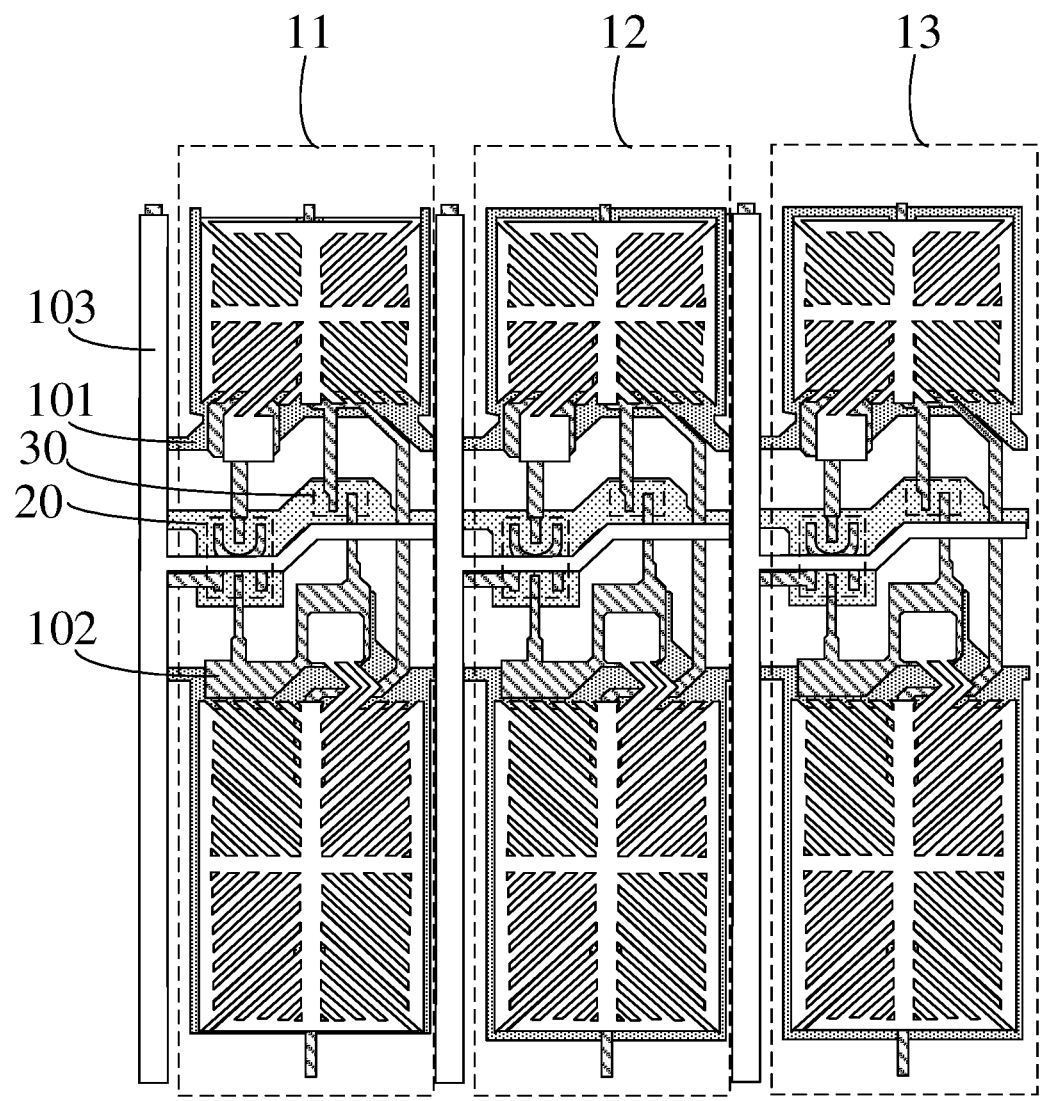
FIG. 1 is a schematic planar structure diagram of an array substrate according to an embodiment of the present disclosure.
Figure 2:
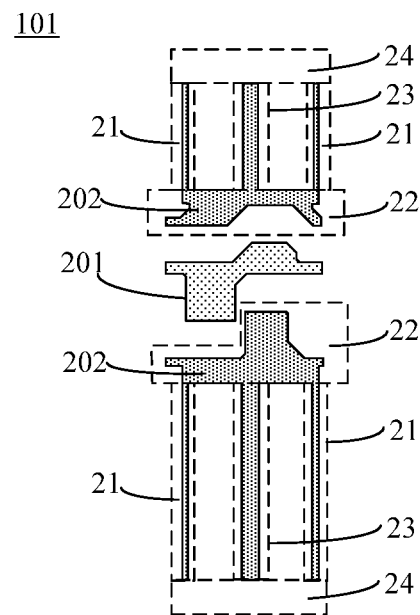
FIG. 2 is a schematic planar structure diagram of a first metal layer in an array substrate according to an embodiment of the present disclosure.
Figure 3:
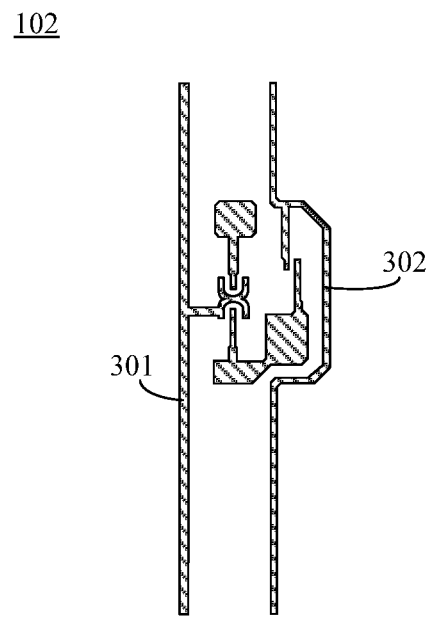
FIG. 3 is a schematic planar structure diagram of a source/drain electrode layer in an array substrate according to an embodiment of the present disclosure.
Figure 4:
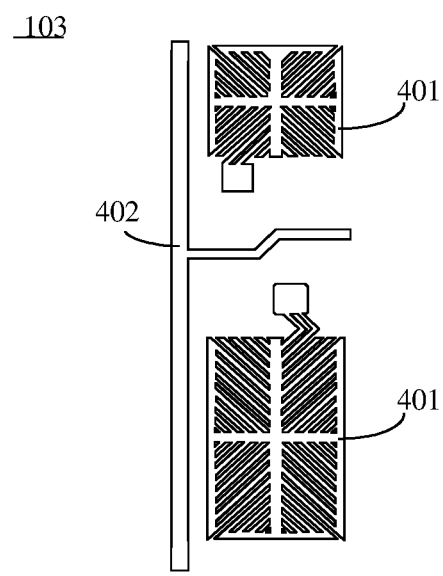
FIG. 4 is a schematic planar structure diagram of a pixel electrode layer in an array substrate according to an embodiment of the present disclosure.

As shown in FIG. 1, FIG. 1 is a schematic planar structure diagram of an array substrate according to an embodiment of the present disclosure. FIG. 1 shows stacked effect of each film layer in the array substrate, which comprises an active layer, a first metal layer 101, a source/drain electrode layer 102, and a pixel electrode layer 103. Pixels in FIG. 1 comprise a first sub-pixel 11, a second sub-pixel 12, and a third sub-pixel 13. FIG. 2 to FIG. 4 are schematic planar structure diagrams of each film layer, and for convenience, only structures of the first sub-pixel 11 are shown. The following describes the array substrate with reference to FIG. 1 to FIG. 4.

In the embodiment, as shown in FIG. 1, the array substrate comprises a substrate, a buffer layer, an active layer, a first gate insulating layer, a first metal layer 101, a second gate insulating layer, a second metal layer, an interlayer dielectric layer, a source/drain electrode layer 102, a planarization layer, and a pixel electrode layer 103 stacked from bottom to top.

The substrate is usually a rigid substrate, such as glasses or transparent resins, and may be a flexible substrate, such as polyimide. The structure of the substrate is not limited in the present disclosure.

The buffer layer is disposed on a side of the substrate, and the buffer layer may be made of inorganic materials, such as silicon oxide or silicon nitride.

The active layer is disposed on the buffer layer, and the active layer may be made of metal oxide, such as indium gallium zinc oxide (IGZO), but is not limited thereto. The material of the active layer may also be one or more of aluminum zinc oxide (AZO), indium zinc oxide (IZO), zinc oxide (ZnO), indium oxide (In2O3), boron-doped zinc oxide (BZO), and magnesium-doped zinc oxide (MZO). Besides, the active layer also can be made of polysilicon materials or other materials.

The first gate insulating layer is disposed on the active layer, and the gate insulating layer may be made of inorganic materials, such as silicon oxide or silicon nitride.

The first metal layer 101 is disposed on the first gate insulating layer, and the first metal layer 101 can be made of molybdenum, aluminum, or copper, which is not limited thereto. It also can be made of chrome, tungsten, titanium, tantalum, or alloys thereof, which is not specifically limited herein. As shown in FIG. 2, the first metal layer 101 is patterned to form gate electrodes of each thin film transistor, a first electrode plate of a storage capacitor, scanning lines 201, and shield electrodes 202 by etching processes, wherein the gate electrodes of each sub-pixel on a same row of pixels are connected to a same scanning line 201.

The second gate insulating layer is disposed on the first metal layer 101, and the second gate insulating layer can be made of inorganic materials, such as silicon oxide or silicon nitride.

The second metal layer is disposed on the second gate insulating layer, and the second metal layer can be made of molybdenum, aluminum, or copper, which is not limited thereto. It also can be made of chrome, tungsten, titanium, tantalum, or alloys thereof, which is not specifically limited herein. The second metal layer is patterned to form a second electrode plate of the storage capacitor.

The interlayer dielectric layer is disposed on the second metal layer, and the interlayer dielectric layer can be made of inorganic materials, such as silicon oxide or silicon nitride.

The source/drain electrode layer 102 is disposed on the interlayer dielectric layer, and the source/drain electrode layer 102 can be made of molybdenum, aluminum, or copper, which is not limited thereto. It also can be made of chrome, tungsten, titanium, tantalum, or alloys thereof. As shown in FIG. 3, the source/drain electrode layer 102 is patterned to form source electrodes and drain electrodes of each thin film transistor, data lines 301 and common electrode lines 302 by etching processes, wherein the drain electrodes of each thin film transistor on a same column of sub-pixels are connected to the data lines 301 on a left and a right columns of the column of the sub-pixels.

The planarization layer is disposed on the source/drain electrode layer 102, and a material of the planarization layer may be a photoresist, which is disposed on the source/drain electrode layer 102 by coating.

The pixel electrode layer 103 is disposed on the planarization layer and connected to the source/drain electrode layer 102 by a through-hole. As shown in FIG. 4, the pixel electrode layer 103 is patterned to form common electrode lines 402 of pixel electrodes 401.

In the present disclosure, the array substrate comprises the plurality of data lines 301 arranged at intervals along a vertical direction, and the plurality of scanning lines 201 arranged at intervals along a horizontal direction, wherein the data lines 301 and the scanning lines 201 are crossed and arranged vertically, and the common electrode lines 302 are in parallel with the data lines 301 and are disposed between the adjacent data lines 301.

The array substrate further comprises the plurality of pixels arranged in an array distribution and performing the displaying driven by the scanning lines 201 and the data lines 301. Each pixel comprises a first sub-pixel 11, a second sub-pixel 12, and a third sub-pixel 13. In the present disclosure, the first sub-pixels 11 are red sub-pixels, the second sub-pixels 12 are green sub-pixels, and the third sub-pixels 13 are blue sub-pixels.

R represents a red sub-pixel, G represent a green sub-pixel, and B represent a blue sub-pixel. In a same row of pixels, an arrangement of the sub-pixels is "RGBRGBRGB . . . ", wherein each sub-pixel in the same row of the pixels is connected to a same scanning line 201. The sub-pixels in a same column are the same, and each column of sub-pixels is connected to the data lines 301 adjacent to the column of sub-pixels. When each sub-pixel needs to be displayed, the scanning lines 201 scan row by row, control each pixel to be turned on row by row, and then input signals through data lines 301, making the pixels of each column emit light to display.

A first sub-pixel 11 comprises a main pixel area and an auxiliary pixel area. As shown in FIG. 1, the main pixel area is an area above the scanning lines 201, and the auxiliary pixel area is an area below the scanning lines 201. The pixel electrodes 401 comprise two parts disposed in the main pixel area and the auxiliary pixel area, and each part comprises a crossed backbone and a branch part connected to the backbone, wherein the backbones divide each part of the pixel electrodes 401 into four display domains, and the main pixel area and the auxiliary pixel area comprise eight display domains.

The scanning lines 201 control the displaying of the sub-pixels in the main pixel area and the auxiliary pixel area by turning on or turning off transistors 20. The common electrode lines 302 control the sub-pixels in the auxiliary pixel area through common capacitors 30, thereby reducing potentials thereof and achieving difference display between the main pixel area and the auxiliary pixel area.

The shield electrodes 202 are formed in the first metal layer 101 and used to shield a lateral electric field in the array substrate. In a normal condition, the lateral electric field would be generated between the pixel electrodes 401 and the data lines 301, between the pixel electrodes 401 and the scanning lines 201, and between the pixel electrodes 401 in adjacent rows of pixels, so it needs to dispose the shield electrodes 202. In addition, the shield electrodes 202 are also usually disposed between the common electrode lines 302 and the active layer.

As shown in FIG. 2, in the pixels, areas where the shield electrodes 202 can be disposed comprise first areas 21 adjacent to the data lines 301, second areas 22 adjacent to the scanning lines 201, third areas 23 corresponding to the common electrode lines 302, and fourth areas 24 between adjacent rows of the pixels. FIG. 2 shows the shield electrodes 202 in a first sub-pixel 11. In the embodiment, a disposition density of the shield electrodes 202 corresponding to the first sub-pixels 11 is less than a disposition density of the shield electrodes corresponding to third sub-pixels 13.

Figure 5:
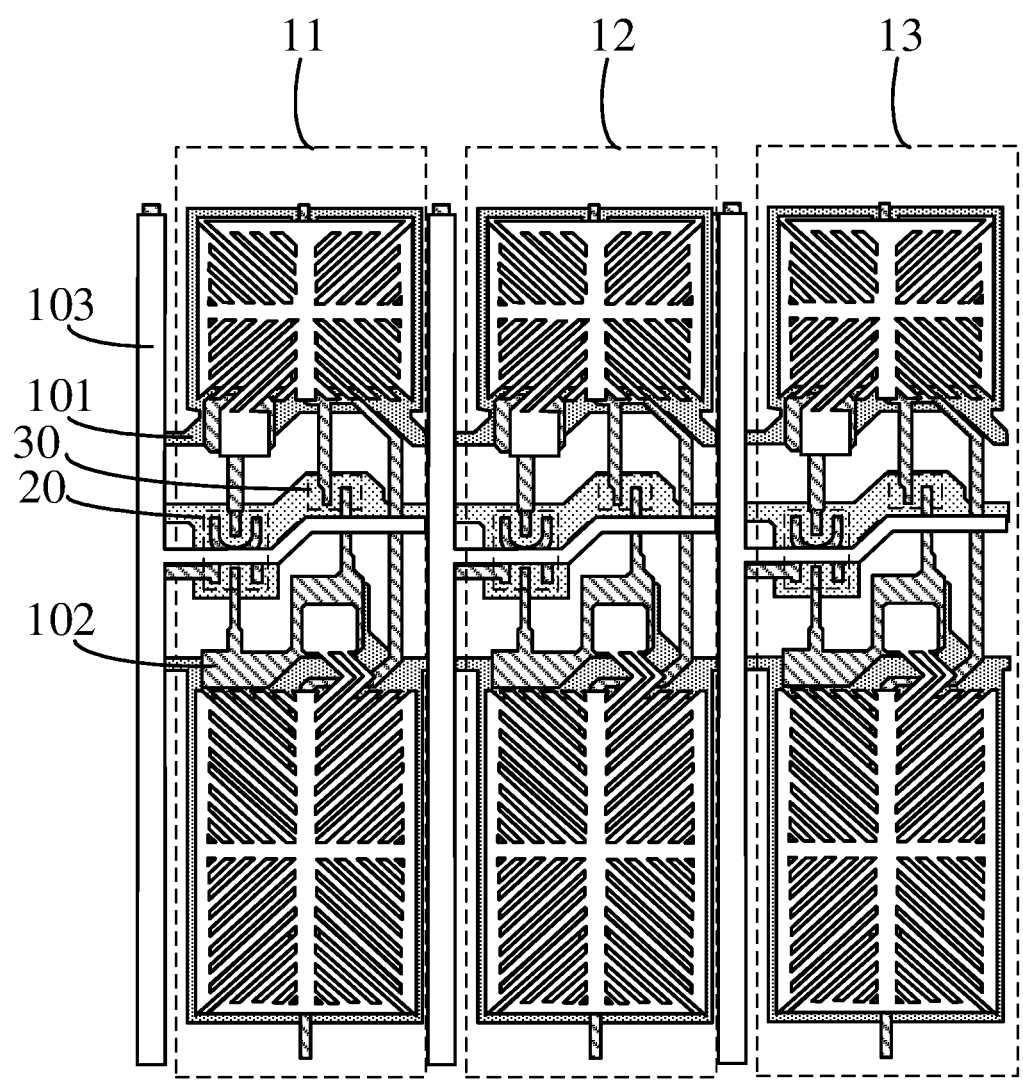
FIG. 5 is a schematic planar structure diagram of an array substrate in current technology.

As shown in FIG. 5, FIG. 5 is a schematic planar structure diagram of an array substrate in current technology. In current technology, dispositions of shield electrodes 202 are the same in first sub-pixels 11, second sub-pixels 12, and third sub-pixels 13, and first areas 21, second areas 22, third areas 23, and fourth areas 24 are all provided with the shield electrodes 202. Wherein, in the main pixel area, the shield electrodes 202 in the first areas 21, the second areas 22, and the third areas 23 surround to form ring structures, which can shield the pixel electrodes 401 from a coupling effect of hopping electric fields with high-potential and high-frequency in data lines 301, thereby making the pixels having a stable voltage and preventing crosstalk, degradation of picture taste, or even abnormality. In addition, with the shield electrodes 202 in the fourth areas 24, the shield electrodes 202 in the four areas present a reticulate structure, which have effects of reducing impedance and stabilizing signals, and can prevent a photocurrent effect of the active layer under the common electrode lines 302 to affect the taste of panels.

However, in current manufacturing process, limited by process conditions, cross-sectional surfaces of the shield electrodes 202 formed are trapezoidal, and when an extending direction of a side of the trapezoid has a predetermined range of angle with a polarization axis of a polarizer, it will cause the liquid crystal display panel to have dark-state light leakage. For red sub-pixels, an intensity of the light leakage is the greatest, light leakage phenomenon is the most serious, and a damage to the dark state is the most significant, which need to be improved.

In the embodiment, a disposition density of the shield electrodes 202 corresponding to the first sub-pixels 11 is less than a disposition density of the shield electrodes corresponding to the third sub-pixels 13. Because the light leakage is the most serious in the first sub-pixels 11, the number of the shield electrodes 202 disposed in the first sub-pixels 11 is less, thereby the intensity of light leakage is reduced. Therefore, the dark-state light leakage phenomenon is reduced in the entire liquid crystal display panel by reducing the intensity of dark-state light leakage of the first sub-pixels 11. The light leakage phenomenon is less in the third sub-pixels 13, so the number of the shield electrodes 202 disposed in the third sub-pixels 13 is greater, which ensures the shielding effect from the lateral electric field. Shielding from the lateral electric field and improving dark-state light leakage can be achieved simultaneously by reasonably adjusting disposition densities of the shield electrodes 202 in each sub-pixel.

There are a lot of ways of adjusting the disposition density of the shield electrodes corresponding to the first sub-pixels 11 less than the disposition density of the shield electrodes corresponding to the third sub-pixels 13. In an embodiment of the present disclosure, the shield electrodes 202 are disposed in the four areas corresponding to the second sub-pixels 12 and the third sub-pixels 13, and are not disposed in at least a part of the four areas corresponding to the first sub-pixels 11.

In an embodiment of the present disclosure, as shown in FIG. 1 and FIG. 2, corresponding to the first sub-pixels 11, the shield electrodes 202 are disposed in the first areas 21, the second areas 22, and the third areas 23, and the shield electrodes 202 are not disposed in at least a part of the fourth areas 24. The main pixel area and the auxiliary pixel area all comprise the fourth areas 24. The shield electrodes 202 can be not disposed only in the fourth areas 24 of the main pixel area or the auxiliary pixel area, or can be not disposed in all the fourth areas 24 to improve the dark-state light leakage between adjacent rows of pixels.

In an embodiment of the present disclosure, corresponding to the first sub-pixels 11, the shield electrodes 202 are disposed in the first areas 21, the second areas 22, and the fourth areas 24, and the shield electrodes 202 are not disposed in at least a part of the third areas 23. The main pixel area and the auxiliary pixel area all comprise the third areas 23. The shield electrodes 202 can be not disposed only in the third areas 23 of the main pixel area or the auxiliary pixel area, or can be not disposed in all the third areas 23 to improve the dark-state light leakage in the middle of each sub-pixel.

In an embodiment of the present disclosure, corresponding to the first sub-pixels 11, the shield electrodes 202 are disposed in the second areas 22, the third areas 23, and the fourth areas 24, and the shield electrodes 202 are not disposed in at least a part of the first areas 21. The main pixel area and the auxiliary pixel area all comprise the first areas 21. The shield electrodes 202 can be not disposed only in the first areas 21 of the main pixel area or the auxiliary pixel area, or can be not disposed in all the first areas 21 to improve the dark-state light leakage adjacent to each scanning line 201.

In an embodiment of the present disclosure, corresponding to the first sub-pixels 11, the shield electrodes 202 are disposed in the first areas 21, and the second areas 22, and the shield electrodes 202 are not disposed in at least a part of the third areas 23 and at least a part of the fourth areas 24. The embodiment improves the dark-state light leakage in the middle of each sub-pixel and between the adjacent rows of pixels by reducing the number of the shield electrodes 202 in the third areas 23 and the fourth areas 24.

In an embodiment of the present disclosure, corresponding to the first sub-pixels 11, the shield electrodes 202 are disposed in the second areas 22, and the fourth areas 24, and the shield electrodes 202 are not disposed in at least a part of the first areas 21 and at least a part of the third areas 23. The embodiment improves the dark-state light leakage adjacent to each scanning line 201 and in the middle of each sub-pixel by reducing the number of the shield electrodes 202 in the first areas 21 and the third areas 23.

In an embodiment of the present disclosure, corresponding to the first sub-pixels 11, the shield electrodes 202 are disposed in the second areas 22, and the shield electrodes 202 are not disposed in at least a part of the first areas 21, at least a part of the third areas 23, and at least a part of the fourth areas 24. The embodiment improves the dark-state light leakage adjacent to each scanning line 201, in the middle of each sub-pixel, and between the adjacent rows of pixels by reducing the number of the shield electrodes 202 in the first areas 21, the third areas 23, and the fourth areas 24.

In an embodiment of the present disclosure, the shield electrodes 202 are disposed in the four areas corresponding to the third sub-pixels 13, and are not disposed in at least a part of the four areas corresponding to the first sub-pixels 11 and the second sub-pixels 12. In the above embodiments, the shield electrodes 202 in the second sub-pixels 12 are not changed. The light leakage phenomenon is less in the second sub-pixels 12, but the disposition of the shield electrodes 202 in the second sub-pixels 12 still can be improved, thereby solving the light leakage in a certain degree.

In an embodiment of the present disclosure, a disposition density of the shield electrodes 202 corresponding to the second sub-pixels 12 is greater than or equal to the disposition density of the shield electrodes 202 corresponding to the first sub-pixels 11. The disposition of the shield electrodes 202 in the second sub-pixels 12 are similar to the disposition in the first sub-pixels 11 of the above embodiments. That the disposition density of the shield electrodes 202 in the second sub-pixels 12 is greater than the disposition density of the shield electrodes 202 in the first sub-pixels 11 refers to that the number of areas in the second sub-pixels 12 where the shield electrodes 202 are disposed is greater than the number of areas in the first sub-pixels 11 where the shield electrodes 202 are disposed. When the disposition density of the shield electrodes 202 in the second sub-pixels 12 is equal to the disposition density of the shield electrodes 202 in the first sub-pixels 11, the disposition position of the shield electrodes 202 corresponding to the second sub-pixels 12 is the same as the disposition position of the shield electrodes 202 corresponding to the first sub-pixels 11, which has a simpler process when manufacturing. The shield electrodes 202 in the first sub-pixels 11 and the second sub-pixels 12 can be disposed in same areas or different areas. Designers in this field can reasonably set disposition areas of shield electrodes 202 in the first sub-pixels 11 and second sub-pixels 12 according to needs.

In an embodiment of the present disclosure, a disposition density of the shield electrodes 202 corresponding to odd rows of the first sub-pixels 11 is greater than a disposition density of the shield electrodes 202 corresponding to even rows of the first sub-pixels 11. In the entire array substrate, it can improve the light leakage of odd rows of pixels and ensure the shielding effect of even rows of pixels at the same time by arranging the first sub-pixels 11 provided with the shield electrodes 202 at intervals. In addition, the disposition density of the shield electrodes 202 corresponding to even rows of the first sub-pixels 11 may be greater than the disposition density of the shield electrodes 202 corresponding to odd rows of the first sub-pixels 11, which has a similar principle.

In an embodiment of the present disclosure, a disposition density of the shield electrodes 202 corresponding to odd columns of the first sub-pixels 11 is greater than a disposition density of the shield electrodes 202 corresponding to even columns of the first sub-pixels 11. In the entire array substrate, it can improve the light leakage of odd columns of pixels and ensure the shielding effect of even columns of pixels at the same time by arranging the first sub-pixels 11 provided with the shield electrodes 202 at intervals. In addition, the disposition density of the shield electrodes 202 corresponding to even columns of the first sub-pixels 11 may be greater than the disposition density of the shield electrodes 202 corresponding to odd columns of the first sub-pixels 11, which has a similar principle.

In an embodiment of the present disclosure, disposition densities of the shield electrodes 202 corresponding to all the first sub-pixels 11 are the same. Therefore, the intensity of light leakage in the entire panel is improved.

The present disclosure further provides a liquid crystal display panel which comprises a first substrate and a second substrate disposed opposite to the first substrate, wherein the first substrate comprises:

a plurality of data lines arranged at intervals along a vertical direction;

a plurality of scanning lines arranged at intervals along a horizontal direction;

a plurality of common electrode lines in parallel with the data lines and disposed between the adjacent data lines; and a plurality of pixels arranged in an array distribution, wherein the pixels comprise first sub-pixels, second sub-pixels, and third sub-pixels;

wherein in the pixels, first areas corresponding to and adjacent to the data lines, second areas corresponding to and adjacent to the scanning lines, third areas corresponding to the common electrode lines, and fourth areas between adjacent rows of the pixels are provided with shield electrodes, and a disposition density of the shield electrodes corresponding to the first sub-pixels is less than a disposition density of the shield electrodes corresponding to the third sub-pixels.

In the liquid crystal display panel of the present disclosure, the first substrate is an array substrate, and the second substrate is a color filter substrate. The array substrate and the color filter substrate are disposed opposite to each other, and liquid crystals are filled in the middle of them. In addition, the present disclosure also can be applied in a COA type liquid crystal display panel.

In an embodiment of the present disclosure, the shield electrodes are disposed in the four areas corresponding to the second sub-pixels and the third sub-pixels, and are not disposed in at least a part of the four areas corresponding to the first sub-pixels.

In an embodiment of the present disclosure, corresponding to the first sub-pixels, the shield electrodes are disposed in the first areas, the second areas, and the third areas, and the shield electrodes are not disposed in at least a part of the fourth areas.

In an embodiment of the present disclosure, corresponding to the first sub-pixels, the shield electrodes are disposed in the first areas, the second areas, and the fourth areas, and the shield electrodes are not disposed in at least a part of the third areas.

In an embodiment of the present disclosure, corresponding to the second sub-pixels, the shield electrodes are disposed in the first areas, the third areas, and the fourth areas, and the shield electrodes are not disposed in at least a part of the second areas.

In an embodiment of the present disclosure, corresponding to the first sub-pixels, the shield electrodes are disposed in the first areas and the second areas, and the shield electrodes are not disposed in at least a part of the third areas and at least a part of the fourth areas.

In an embodiment of the present disclosure, corresponding to the first sub-pixels, the shield electrodes are disposed in the second areas and the fourth areas, and the shield electrodes are not disposed in at least a part of the first areas and at least a part of the third areas.

In an embodiment of the present disclosure, corresponding to the first sub-pixels, the shield electrodes are disposed in the second areas, and the shield electrodes are not disposed in at least a part of the first areas, at least a part of the third areas, and at least a part of the fourth areas.

In an embodiment of the present disclosure, the shield electrodes are disposed in the four areas corresponding to the third sub-pixels, and are not disposed in at least a part of the four areas corresponding to the first sub-pixels and the second sub-pixels.

In an embodiment of the present disclosure, a disposition density of the shield electrodes corresponding to the second sub-pixels is greater than or equal to the disposition density of the shield electrodes corresponding to the first sub-pixels.

In an embodiment of the present disclosure, a disposition position of the shield electrodes corresponding to the second sub-pixels is same as a disposition position of the shield electrodes corresponding to the first sub-pixels.

In an embodiment of the present disclosure, a disposition density of the shield electrodes corresponding to odd rows of the first sub-pixels is greater than a disposition density of the shield electrodes corresponding to even rows of the first sub-pixels.

In an embodiment of the present disclosure, a disposition density of the shield electrodes corresponding to odd columns of the first sub-pixels is greater than a disposition density of the shield electrodes corresponding to even columns of the first sub-pixels.

In an embodiment of the present disclosure, disposition densities of the shield electrodes corresponding to all the first sub-pixels are the same.

It can be known according to the above embodiments:

the present disclosure provides an array substrate and a liquid crystal display panel. The array substrate includes data lines, scanning lines, common electrode lines, and pixels, wherein the plurality of data lines are arranged at intervals along a vertical direction, the plurality of scanning lines are arranged at intervals along a horizontal direction, the common electrode lines are in parallel with the data lines and are disposed between the adjacent data lines, and the plurality of pixels are arranged in an array distribution, wherein the pixels comprise first sub-pixels, second sub-pixels, and third sub-pixels. Wherein in the pixels, first areas corresponding to and adjacent to the data lines, second areas corresponding to and adjacent to the scanning lines, third areas corresponding to the common electrode lines, and fourth areas between adjacent rows of the pixels are provided with shield electrodes, and a disposition density of the shield electrodes corresponding to the first sub-pixels is less than a disposition density of the shield electrodes corresponding to the third sub-pixels. The present disclosure reduces a density of the shield electrodes in the first sub-pixels, which reduces an intensity of the dark-state light leakage in the first sub-pixels, thereby reducing the dark-state light leakage phenomenon of the whole liquid crystal display panel.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. An array substrate, comprising:
a plurality of data lines arranged at intervals along a vertical direction;
a plurality of scanning lines arranged at intervals along a horizontal direction;
a plurality of common electrode lines in parallel with the data lines and disposed between the adjacent data lines; and
a plurality of pixels arranged in an array distribution, wherein the pixels comprise first sub-pixels, second sub-pixels, and third sub-pixels;
wherein in the pixels, first areas corresponding to and adjacent to the data lines, second areas corresponding to and adjacent to the scanning lines, third areas corresponding to the common electrode lines, and fourth areas between adjacent rows of the pixels are provided with shield electrodes, and a disposition density of the shield electrodes corresponding to the first sub-pixels is less than a disposition density of the shield electrodes corresponding to the third sub-pixels.

2. The array substrate according to claim 1, wherein the shield electrodes are disposed in the four areas corresponding to the second sub-pixels and the third sub-pixels, and are not disposed in at least a part of the four areas corresponding to the first sub-pixels.

3. The array substrate according to claim 2, wherein corresponding to the first sub-pixels, the shield electrodes are disposed in the first areas, the second areas, and the third areas, and the shield electrodes are not disposed in at least a part of the fourth areas.

4. The array substrate according to claim 2, wherein corresponding to the first sub-pixels, the shield electrodes are disposed in the first areas, the second areas, and the fourth areas, and the shield electrodes are not disposed in at least a part of the third areas.

5. The array substrate according to claim 2, wherein corresponding to the first sub-pixels, the shield electrodes are disposed in the second areas, the third areas, and the fourth areas, and the shield electrodes are not disposed in at least a part of the first areas.

6. The array substrate according to claim 2, wherein corresponding to the first sub-pixels, the shield electrodes are disposed in the first areas and the second areas, and the shield electrodes are not disposed in at least a part of the third areas and at least a part of the fourth areas.

7. The array substrate according to claim 2, wherein corresponding to the first sub-pixels, the shield electrodes are disposed in the second areas and the fourth areas, and the shield electrodes are not disposed in at least a part of the first areas and at least a part of the third areas.

8. The array substrate according to claim 2, wherein corresponding to the first sub-pixels, the shield electrodes are disposed in the second areas, and the shield electrodes are not disposed in at least a part of the first areas, at least a part of the third areas, and at least a part of the fourth areas.

9. The array substrate according to claim 1, wherein the shield electrodes are disposed in the four areas corresponding to the third sub-pixels, and are not disposed in at least a part of the four areas corresponding to the first sub-pixels and the second sub-pixels.

10. The array substrate according to claim 9, wherein a disposition density of the shield electrodes corresponding to the second sub-pixels is greater than or equal to the disposition density of the shield electrodes corresponding to the first sub-pixels.

11. The array substrate according to claim 10, wherein a disposition position of the shield electrodes corresponding to the second sub-pixels is same as a disposition position of the shield electrodes corresponding to the first sub-pixels.

12. The array substrate according to claim 1, wherein a disposition density of the shield electrodes corresponding to odd rows of the first sub-pixels is greater than a disposition density of the shield electrodes corresponding to even rows of the first sub-pixels.

13. The array substrate according to claim 1, wherein a disposition density of the shield electrodes corresponding to odd columns of the first sub-pixels is greater than a disposition density of the shield electrodes corresponding to even columns of the first sub-pixels.

14. The array substrate according to claim 1, wherein disposition densities of the shield electrodes corresponding to all the first sub-pixels are the same.

15. A liquid crystal display panel, comprising a first substrate and a second substrate disposed opposite to the first substrate, wherein the first substrate comprises:
a plurality of data lines arranged at intervals along a vertical direction;
a plurality of scanning lines arranged at intervals along a horizontal direction;
a plurality of common electrode lines in parallel with the data lines and disposed between the adjacent data lines; and
a plurality of pixels arranged in an array distribution, wherein the pixels comprise first sub-pixels, second sub-pixels, and third sub-pixels;
wherein in the pixels, first areas corresponding to and adjacent to the data lines, second areas corresponding to and adjacent to the scanning lines, third areas corresponding to the common electrode lines, and fourth areas between adjacent rows of the pixels are provided with shield electrodes, and a disposition density of the shield electrodes corresponding to the first sub-pixels is less than a disposition density of the shield electrodes corresponding to the third sub-pixels.

16. The liquid crystal display panel according to claim 15, wherein the shield electrodes are disposed in the four areas corresponding to the second sub-pixels and the third sub-pixels, and are not disposed in at least a part of the four areas corresponding to the first sub-pixels.

17. The liquid crystal display panel according to claim 15, wherein the shield electrodes are disposed in the four areas corresponding to the third sub-pixels, and are not disposed in at least a part of the four areas corresponding to the first sub-pixels and the second sub-pixels.

18. The liquid crystal display panel according to claim 15, wherein a disposition density of the shield electrodes corresponding to odd rows of the first sub-pixels is greater than a disposition density of the shield electrodes corresponding to even rows of the first sub-pixels.

19. The liquid crystal display panel according to claim 15, wherein a disposition density of the shield electrodes corresponding to odd columns of the first sub-pixels is greater than a disposition density of the shield electrodes corresponding to even columns of the first sub-pixels.

20. The liquid crystal display panel according to claim 15, wherein disposition densities of the shield electrodes corresponding to all the first sub-pixels are the same.

* * * * *